(12) United States Patent  
Chestak et al.

(10) Patent No.: US 7,710,648 B2
(45) Date of Patent: May 4, 2010

(54) HIGH RESOLUTION AUTOSTERIOSCOPIC DISPLAY

(75) Inventors: Serguei Chestak, Suwon-si (KR); Dae-sik Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 161 days.

(21) Appl. No.: 11/709,034

(22) Filed: Feb. 22, 2007

(65) Prior Publication Data

US 2007/0195163 A1 Aug. 23, 2007

(30) Foreign Application Priority Data

Feb. 22, 2006 (KR) .................. 10-2006-0017310

(51) Int. Cl.
*G02B 27/26* (2006.01)
*G02B 27/22* (2006.01)

(52) U.S. Cl. .................. 359/465; 359/463; 359/462; 359/464

(58) Field of Classification Search .................. 359/463, 359/465, 462, 464

See application file for complete search history.

(56) References Cited

U.S. PATENT DOCUMENTS

| 3,329,474 A | 7/1967 | Harris et al. |
| 5,537,256 A | 7/1996 | Fergason |
| 5,568,313 A * | 10/1996 | Steenblik et al. ............ 359/463 |
| 5,606,455 A | 2/1997 | Eichenlaub |
| 5,639,580 A * | 6/1997 | Morton ........................ 430/11 |
| 5,875,055 A | 2/1999 | Morishima et al. |
| 6,392,690 B1 | 5/2002 | Fujii et al. |
| 6,473,141 B2 * | 10/2002 | Moseley et al. ............... 349/15 |
| 2005/0117216 A1 | 6/2005 | Lee |
| 2006/0139751 A1* | 6/2006 | Cha et al. .................... 359/465 |

FOREIGN PATENT DOCUMENTS

| EP | 0751683 A2 | 1/1997 |
| FR | 2611389 A1 | 9/1988 |
| JP | 09-018897 A | 1/1997 |
| JP | 10-206794 A | 8/1998 |
| JP | 2004-184895 A | 7/2004 |

* cited by examiner

*Primary Examiner*—Audrey Y Chang
(74) *Attorney, Agent, or Firm*—Sughrue Mion, PLLC (57) ABSTRACT

A high resolution autostereoscopic display includes: a backlight; a display panel forming an image using the backlight light; a viewing zone separator separating viewing zones of right and left eye images of the display panel; a polarizer polarizing the light from the display panel into first polarized light; a polarization switch converting the first polarized light into second polarized light that is polarized in a different direction; and a birefringent plate including a refractive index that varies consistent with the polarization of incident light. Images corresponding to odd and even numbered column fields are formed with the first and second polarized light, time-sequentially. The birefringent plate shifts the second polarized light with respect to the first. A three-dimensional image with the full resolution of the display panel is formed by images corresponding to an odd-numbered and even-numbered column field with the first and shifted second polarized light, respectively.

15 Claims, 10 Drawing Sheets

ODD-NUMBERED FIELD

FIG. 5B

EVEN-NUMBERED FIELD

FIG. 12 ately displaying left and right eye images. In this case, the left eye image and the right eye image are displayed at the full resolution of the display panel. In such a system, in order to sequentially display frames, a unit selectively switching between and displaying the left eye image and the right eye image is needed.

Figure 1:
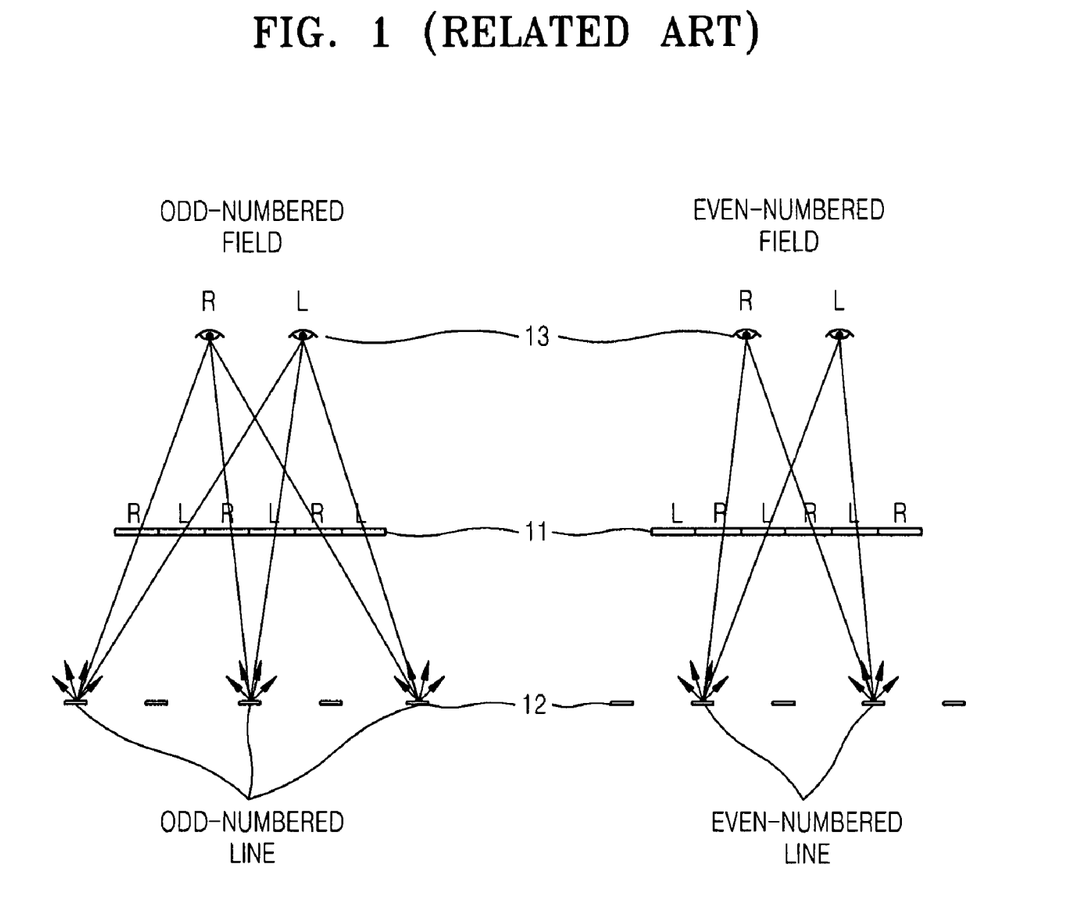
FIG. 1 is a schematic view of a related art stereoscopic image display disclosed in U.S. Pat. No. 5,606,455.

FIG. 1 illustrates a related art autostereoscopic display disclosed in U.S. Pat. No. 5,606,455. A backlight unit (not shown) alternately operates two sets of secondary light sources that are shaped as vertical lines (that is, odd-numbered lines and even-numbered lines) disposed in a plane 12, and the refreshing of the LCD panel 11 is synchronized with the toggling between the odd-numbered lines and the even-numbered lines. The odd-numbered lines and the even-numbered lines respectively function as Lambert light sources. The LCD panel 11 is separated a predetermined distance from the light sources and provides a stereoscopic viewing zone 13.

During the odd-numbered field period, the LCD panel 11 displays alternating left and right images recorded as R and L to form an odd-numbered field image. At this time, the LCD cells modify light generated from the odd-numbered lines (the even-numbered lines are turned off) so that the right eye of the viewer receives only light transmitted through the right image columns and the left eye receives only light transmitted through the left image columns to sense a stereoscopic image.

During the even-numbered field period, columns that previously displayed right images display left images, and columns that previously displayed left images display right images. During the even-numbered field period, left and right images with half resolution are displayed using light produced by the even-numbered lines while the odd-numbered lines are turned off. The viewer views a three-dimensional even-numbered field image by viewing the light that is emitted from the even-numbered lines and modulated by left and right columns. Here, the positions of the left and right images of the LCD columns cross with their positions in the odd-numbered fields. Since human eyes have character of photogene, the odd-numbered and even-numbered half resolution fields that are sequentially shown are recognized as a full resolution stereoscopic image.

However, due to the limited response time of twisted nematic (TN) LCDs, the left and right images in the columns cannot be changed immediately, and thus the left eye can see the right image, and the right eye can see the left image. Such an undesired phenomenon is generally called "crosstalk," and this crosstalk significantly deteriorates the quality of the stereoscopic image.

Also, since the graphics data displayed on the LCD panel is not simultaneously renewed on the entire panel but renewed line-by-line, whereas the odd-numbered lines and even-numbered lines of the light source are simultaneously turned on and off, an additional source of crosstalk arises.

SUMMARY OF THE INVENTION

The present invention provides an autostereoscopic display displaying an autostereoscopic image with full resolution and little crosstalk.

The present invention also provides an autostereoscopic display displaying high quality stereoscopic images by reducing undesired crosstalk.

According to an aspect of the present invention, there is provided an autostereoscopic display comprising: a backlight unit; a display panel forming an image using light from the backlight unit; a viewing zone separating unit separating viewing zones of a right eye image and a left eye image of the display panel; a polarizer polarizing the light output from the display panel into first polarized light; a polarization switch converting the first polarized light into second polarized light that is polarized in a different direction than the first polarized light; and a birefringent plate that has a refractive index that varies according to the polarization of incident light, wherein an image corresponding to an odd numbered column field is formed with the first polarized light, an image corresponding to an even numbered column field is formed with the second polarized light time-sequentially, wherein the second polarized light is shifted with respect to the first polarized light by the birefringent plate.

The viewing zone separating unit may comprise a parallax barrier that is disposed between the backlight unit and the display panel and transmits light from the backlight unit through a slit to the display panel.

The viewing zone separating unit may comprise a parallax barrier that is disposed between the polarizer and the polarization switch and separates the light output from the display panel through a slit into a right eye image and a left eye image.

The viewing zone separating unit may comprises a lenticular lens array unit that is disposed between the polarizer and the polarization unit and includes alternating opening units and mask units.

The lenticular lens array unit comprises: a lenticular lens array comprising a plurality of lenticular lenses arranged side by side; and a barrier that is disposed in front of the lenticular lens array and has a plurality of masks facing boundary regions between the lenticular lenses.

The lenticular lens array unit may comprise: a lenticular lens array comprising a plurality of lenticular lenses arranged side by side; and a plurality of masks disposed in boundary regions between the lenticular lenses.

The lenticular lens array unit may comprise: a lenticular lens array comprising a plurality of lenticular lenses arranged side by side at predetermined intervals with flat portions between the lenticular lenses; and a plurality of masks respectively disposed on the flat portions.

The lenticular lens array unit may comprise: a lenticular lens array comprising a plurality of lenticular lenses arranged at predetermined intervals with flat portions protruding between the lenticular lenses; and a plurality of masks disposed on the flat portions.

The autostereoscopic display may further comprise: a display controller transferring graphics signals to the display panel; and a polarization switch controller that is synchronized with the display controller and toggles the polarization switch on and off.

The polarization switch may comprise a plurality of segments that are arranged in a direction perpendicular to the refresh direction of the graphics data of the display panel, and the segments are individually switched on and off.

The polarization switch may be synchronized with the graphics data refresh rate of the display panel and switched on and off line by line.

The distance by which the birefringent plate shifts the second polarized light relative to the first polarized light may satisfy the following condition:

$$d = \frac{t(n_0 - n_e)}{2n_0}$$

where t is the thickness of the birefringent plate, $n_0$ is the refractive index of the birefringent plate with respect to the first polarized light, and $n_e$ is the refractive index of the birefringent plate with respect to the second polarized light.

According to another aspect of the present invention, there is provided an autostereoscopic display comprising: a vertically striped light source radiating vertical lines of light at predetermined intervals; a display panel forming from the vertical lines of light a right eye image and a left eye image that are separated; a polarizer polarizing the light output from the display panel into first polarized light; a polarization switch converting the first polarized light into second polarized light that is polarized in a different direction than the first polarized light; and a birefringent plate that has an index of refraction that varies according to the polarization of incident light, wherein an image corresponding to an odd numbered column field is formed with the first polarized light, an image corresponding to an even numbered column field is formed with the second polarized light time-sequentially, and the second polarized light is shifted with respect to the first polarized light by the birefringent plate.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary embodiments of the invention are shown.

Figure 2:
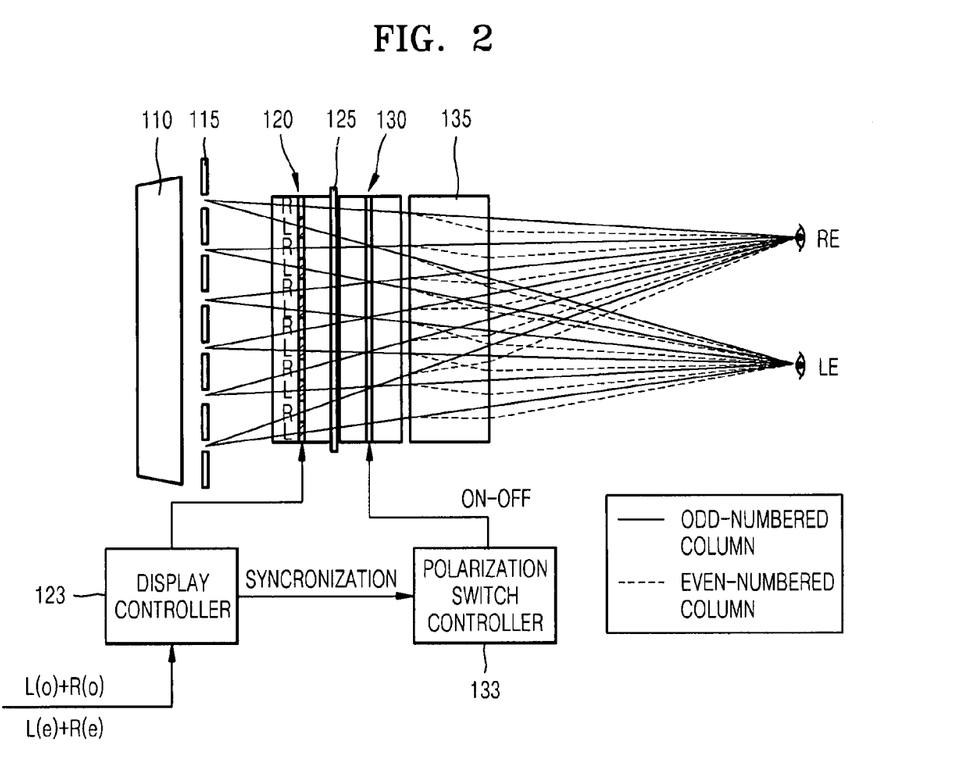
FIG. 2 is a schematic view of an autostereoscopic display according to an exemplary embodiment of the present invention.

FIG. 2 is a schematic view of an autostereoscopic display according to an exemplary embodiment of the present invention. Referring to FIG. 2, the autostereoscopic display includes a backlight unit 110 radiating light, a display panel 120 forming an image using the light from the backlight unit 110, and a viewing zone separating unit 115 separating the viewing zone of a right eye image and a left eye image of the display panel 120.

The autostereoscopic display further includes a polarizer 125 polarizing the light output from the viewing zone separating unit 115, a polarization switch 130 switching the polarization of the light, and a birefringent plate 135 that refracts light according to the polarization of the incident light.

The viewing zone separating unit 115 may be a parallax barrier 115 that is formed between the backlight unit 110 and the display panel 120, and has a plurality of slits. The width of the slits of the parallax barrier 115 is generally smaller than half of the pitch of the parallax barrier 115. The parallax barrier 115 may be formed by vaporizing a mask with an opaque material at predetermined intervals on a transparent substrate. Alternatively, the parallax barrier 115 may have a structure that can be switched on and off in response to a space light modulator that is electrically controlled. When the parallax barrier 115 can be switched on and off, a two-dimensional image can be realized by modulating the parallax barrier 115 to be entirely transparent, or a three-dimensional image can be realized by modulating the parallax barrier to have slits. In this case, a two-dimensional image mode and a three-dimensional image mode can be selectively realized.

The display panel 120 electrically modulates light to form an image, and may be a liquid crystal display (LCD) or a ferro liquid crystal display (FLCD). Also, a display controller 123 transmitting graphics data signals is included in the display panel 120. The display controller 123 can refresh the graphics data at a high refresh rate of, for example, 100 to 120 Hz.

The polarizer 125 polarizes the light emitted from the display panel 120 into first polarized light, for example, s-polarized light. The polarization switch 130 selectively converts the first polarized light into different polarized light, that is, second polarized light. That is, the first polarized light is maintained as the first polarized light or converted into the second polarized light by the polarization switch 130. The polarization switch 130 is driven by a polarization switch controller 133, which is synchronized with the display controller 123.

The refractive index of the birefringent plate 135 is dependent on the polarization of incident light. An ordinary ray whose polarization is parallel to a crystal optical axis of the birefringent plate 135 is directly transmitted according to an ordinary refractive index $n_o$, and an extraordinary ray having a polarization perpendicular to the crystal optical axis of the birefringent plate 135 is refracted according to the extraordinary refractive index $n_e$.

The birefringent plate 135 may be formed of an optical material having a high birefringence ratio, for example, of optically grinded calcite ($CaCO_3$) or lithium niobate ($LiNb_3$).

Figure 3:
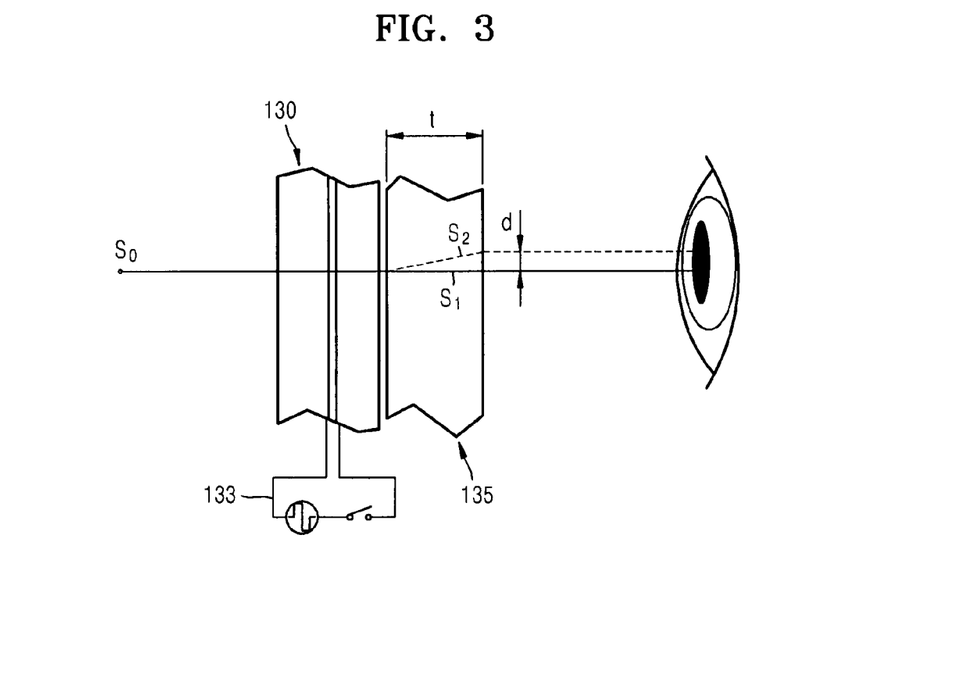
FIG. 3 illustrates the operation of a polarization switch and a birefringent plate included in the autostereoscopic display of FIG. 2 according to the polarization of incident light.

FIG. 3 illustrates the path of the light transmitted through the polarization switch 130 and the refractive panel 135. The optical axis of the polarizer 125 may be parallel to the ordinary or extraordinary crystal optical axis of the birefringent plate 135. In FIG. 3, the optical axis of the polarizer 125 is illustrated as being parallel as the ordinary crystal optical axis of the birefringent plate 135.

When incident light $S_0$ is transmitted through the polarization switch 130 with a first polarization and incident on the birefringent plate 135 when the polarization switch 130 is turned off, the incident light $S_0$ is directly transmitted through the birefringent plate 135 since the birefringent plate 135 has the ordinary refractive index $n_0$ with respect to the light $S_1$ with the first polarization. When the incident light $S_0$ has only a first polarization component and is converted into light with only a second polarization component by the polarization switch 130, which is turned on, and is incident on the birefringent plate 135, since the birefringent plate 135 has the extraordinary refractive index $n_e$ with respect to the light $S_2$ with the second polarization, the incident light $S_0$ is refracted through the birefringent plate 135. The distance by which the light $S_2$ having the second polarization is shifted with respect to the light $S1$ having the first polarization can be expressed by Equation 1.

$$d = \frac{t(n_0 - n_e)}{2n_0}$$ [Equation 1]

where t is the thickness of the birefringent plate 135, $n_o$ is the ordinary refractive index of the birefringent plate 135, and $n_e$ is the extraordinary refractive index of the birefringent plate 135.

Also, the distance of the image is shifted by the birefringent plate 135 may be set to half of the pitch of the parallax barrier.

The effect of the operation of the autostereoscopic display according to an exemplary embodiment of the present invention will now be described.

Figure 4A:
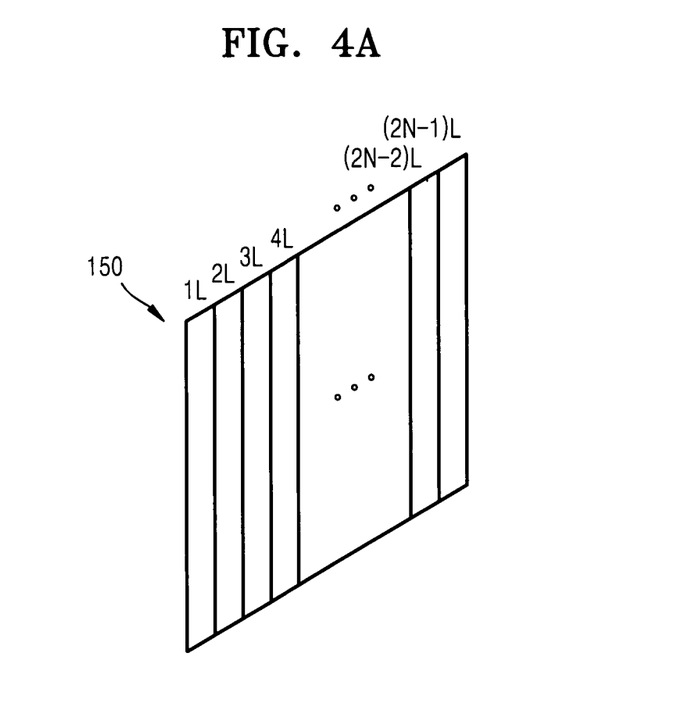
FIG. 4A illustrates a left eye image field.
Figure 4B:
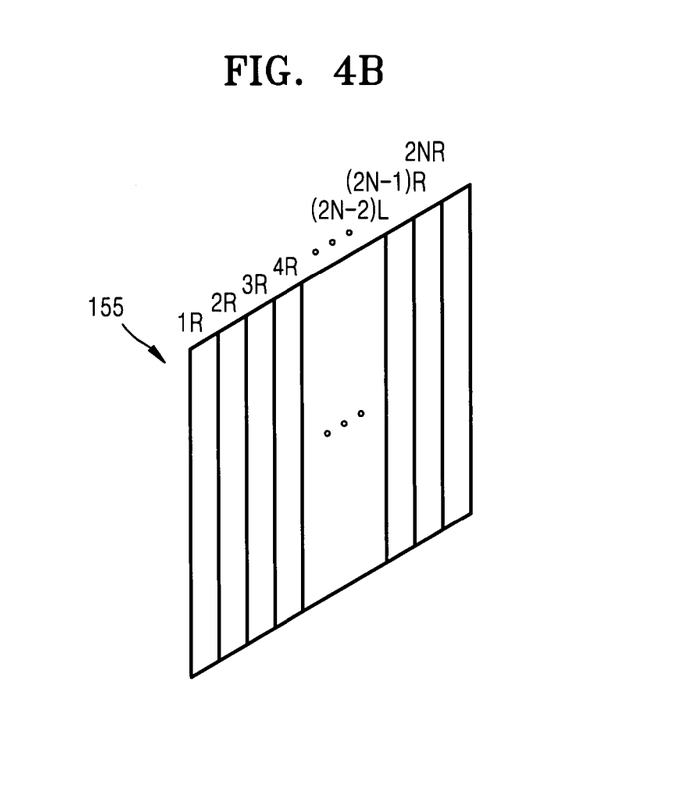
FIG. 4B illustrates a right eye image field.

FIGS. 4A and 4B are schematic views of a left eye image field 150 and a right eye image field 155, respectively. The left eye image field and the right eye image field e.g. are photographed by two cameras from different viewpoints. The left eye field 150 includes odd-numbered columns (1L, 3L, 5L, . . . , (2n−1)L) (n is a natural number) and even-numbered columns (2L, 4L, . . . , (2n−2)L). The right eye image field 155 includes odd-numbered columns (1R, 3R, 5R, . . . , (2n−1)R) and even-numbered columns (2R, 4R, . . . , (2n−2)R). An image with full resolution is displayed as a combination of an image of odd-numbered columns and an image of even-numbered columns.

Figure 5A:
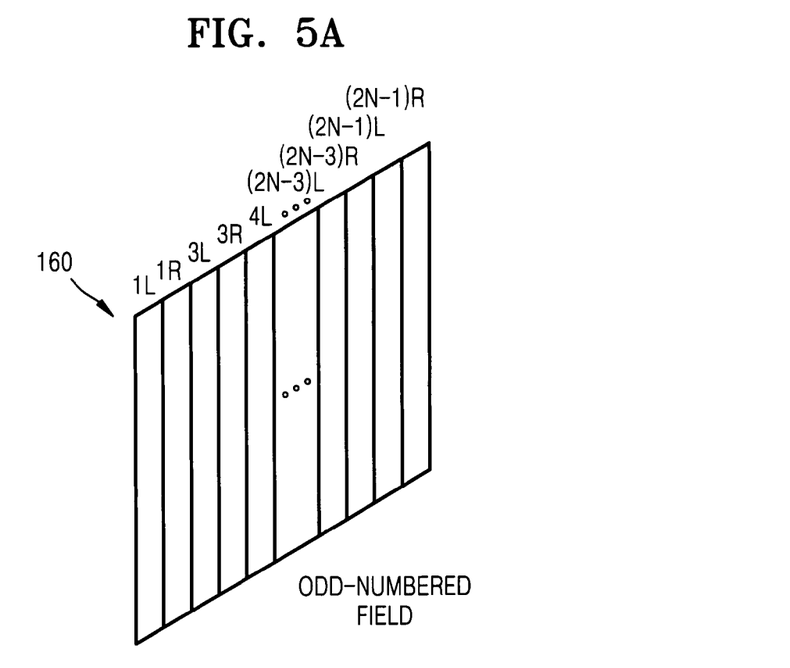
FIG. 5A illustrates odd-numbered fields for left and right eyes.
Figure 6A:
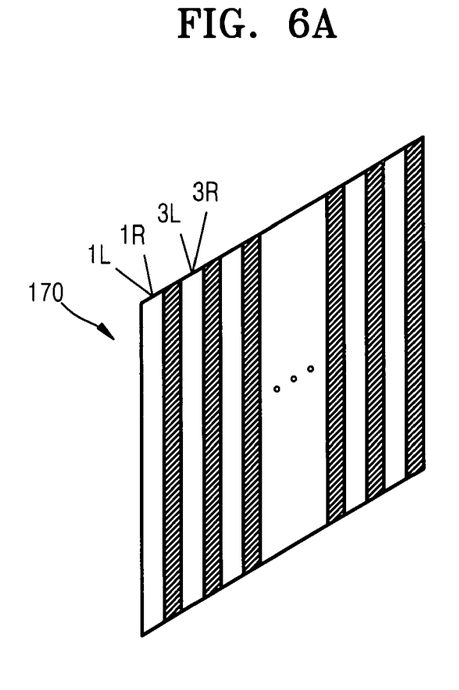
FIG. 6A illustrates an odd-numbered field image.

First, a graphics signal corresponding to a left eye image of odd-numbered columns and another graphics signal corresponding to a right eye image of odd-numbered columns are input by the display controller 123 to the display panel 120, and the left eye image of the odd-numbered columns and the right eye image of the odd-numbered columns are formed according to the input graphics signal. That is, as illustrated in FIG. 5A, an odd-numbered field 160 is formed by the left eye image of the odd-numbered columns and by the right eye image of the odd-numbered columns. Light from the backlight unit 110 is incident on the display panel 120 through the viewing zone separating unit 115, and the left eye image of the odd-numbered columns is separated to a left eye (LE) by the viewing zone separating unit 115, and the right eye image of the odd-numbered columns is separated to a right eye (RE), and thus a three-dimensional image 170 of an odd-numbered field is formed as illustrated in FIG. 6A. That is, a left eye only receives the left eye image of the odd-numbered columns through the slits of the viewing zone separating unit 115, and a right eye only receives the right eye image of the odd-numbered columns.

The left eye image and the right eye image of the odd-numbered field 160 are polarized into first polarized light by the polarizer 125. The polarization switch 130 is turned off, and thus the first polarized light is incident on the birefringent plate 135. The birefringent plate 135 has the ordinary refractive index $n_0$ with respect to the first polarized light, and thus the image of the odd-numbered field 160 of the first polarized light is directly transmitted through the birefringent plate 135.

Figure 5B:
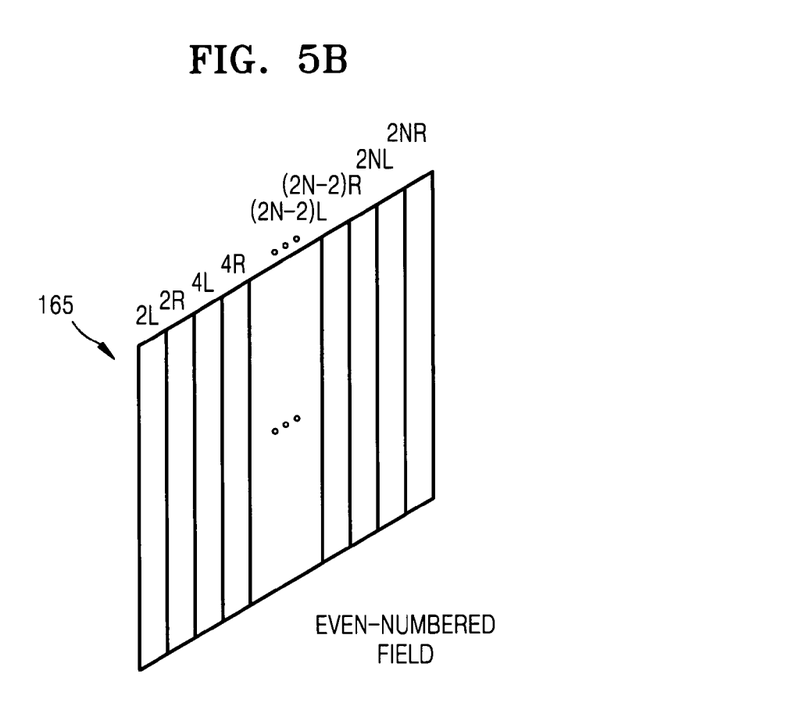
FIG. 5B illustrates even-numbered fields for left and right eyes.

Next, a graphics signal corresponding to a left eye image of even-numbered columns and a graphics signal corresponding to a right eye image of even-numbered columns are input by the display controller 123 to the display panel 120. The polarization switch 125 is synchronized with the display controller 123 to be turned on.

Figure 6B:
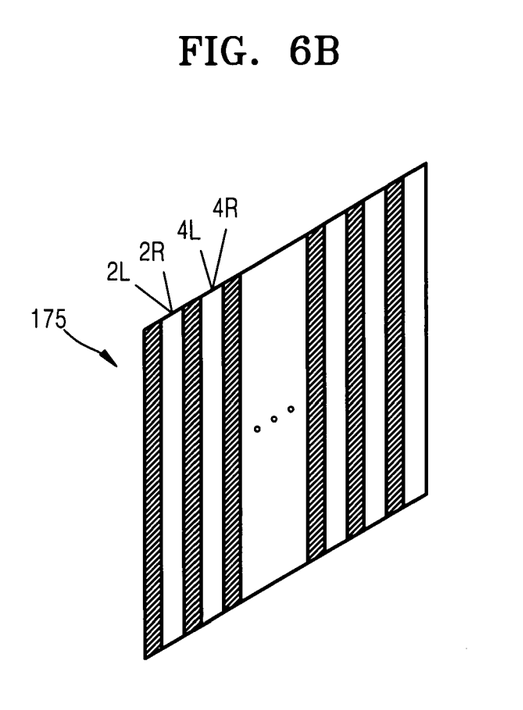
FIG. 6B illustrates an even-numbered field image.

In the display panel 120, the left eye image of the even-numbered columns and the right eye image of the even-numbered columns are formed according to the input signals, and, as illustrated in FIG. 5B, an odd-numbered field 165 is formed by the left eye image of the even-numbered columns and the right eye image of the even-numbered columns. The viewing zone separating unit 115 directs the left eye image of the even-numbered columns to a left eye (LE) and the right eye image of the even-numbered columns to a right eye (RE), and thus a three-dimensional image 175 of an even-numbered field is formed as illustrated in FIG. 6B. The three-dimensional image of the even-numbered field is converted into second polarized light by the polarization switch 125. The even-numbered field image of the second polarized light is refracted due to the extraordinary refractive index $n_e$ in the birefringent plate 135 and transmitted. That is, the even-numbered field image is shifted relative to the odd-numbered field image due to the different refractive indexes, and is thus formed at the left eye and the right eye. FIG. 6A illustrates an odd-numbered field image, and FIG. 6B illustrates an even-numbered field image, illustrating that the even-numbered field image is shifted relative to the odd-numbered field image.

As described above, the autostereoscopic display according to an embodiment of the present invention alternately displays an odd-numbered field image and an even-numbered field image to realize a three-dimensional image at full resolution. Since such field repetition rate is higher than the rate of sensing and maintaining the odd-numbered field or even-numbered field that are displayed half of the full resolution, a full resolution image can be displayed without any flickering.

The display panel 120 comprises m×n liquid crystal pixels arranged in a matrix, m data lines and n gate lines cross each other at the respective pixels, and a TFT is formed at each intersection of the data lines and the gate lines. Each of the TFTs responds to a scan signal supplied from the corresponding gate line, and is switched according to the data signal supplied from the corresponding data line. Since the configuration and operation of liquid crystal display panels are well known to those of ordinary skill in the art, the description thereof will be omitted.

Since the display panel 120 is scanned line by line and refreshed, it is preferable that the polarization switch 130 is synchronized with the refresh rate of the display panel 120 and toggled on and off line by line. Accordingly, the odd-numbered field and the even-numbered field are matched with the graphics signals of the display panel 120, and the left eye image and the right eye image can be displayed to a left eye and a right eye without being mixed. Thus, the crosstalk according to the scanning of the display panel is reduced, and thus a high quality image can be provided.

It may be preferable that the polarization switch be synchronized with the refresh rate of the display panel to be switched on and off, but the polarization switch 130 can also be divided into a plurality of segments to be respectively toggled on and off to reduce crosstalk.

Figure 7:
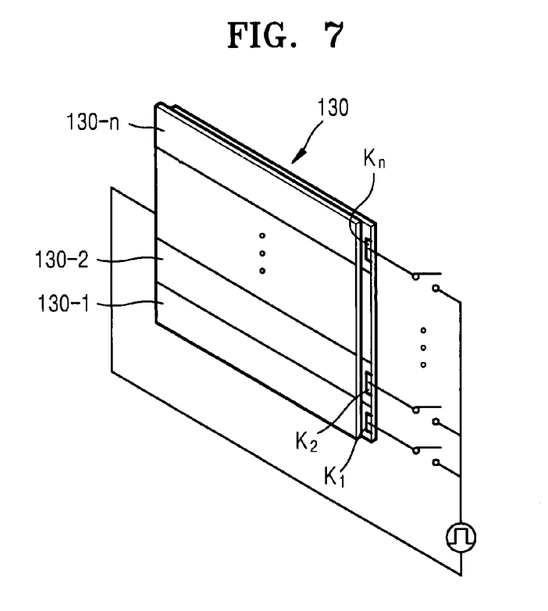
FIG. 7 illustrates a polarization switch that is partitioned into a plurality of segments switched on and off and included in the autostereoscopic display of FIG. 2.
Figure 8:
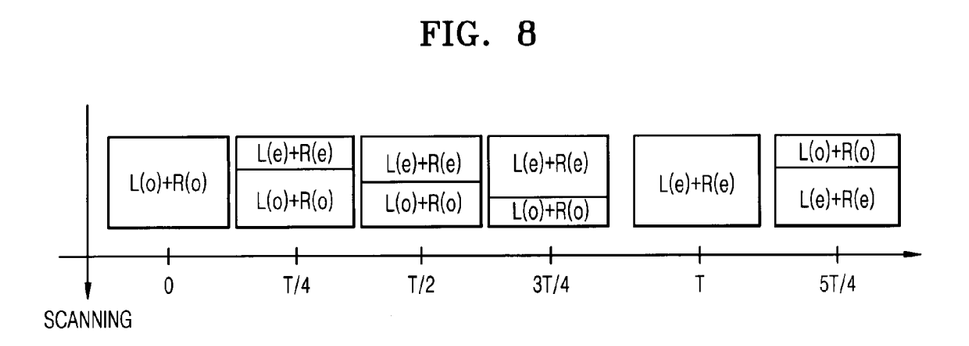
FIG. 8 is a schematic view for explaining the refreshing of a display panel and the polarization switch of FIG. 7.

For example, as illustrated in FIG. 7, the polarization switch 130 can be divided into n segments 130-1, 130-2, ... , 130-n in the refresh direction of the display panel 120, that is, the direction perpendicular to the scanning direction, and the segments 130-1, 130-2, ..., 130-n respectively include switches k1, k2, ..., kn. In this case, each of the segments 130-1, 130-2, ..., 130-n is toggled on or off within a period of T/n where the scanning period of the display panel is T. FIG. 8 illustrates image fields displayed according to the scanning of the display panel when the polarization switch is divided into four segments. In FIG. 8, a right eye odd-numbered column field is designated by R(o), a left eye odd-numbered column field is designated by L(o), a right eye even-numbered column field is designated by R(e), and a left eye even-numbered column field is designated by L(e). When t=0, {L(o)+R(o)} is input, first, second, third, and fourth segments of the polarization switch 130 are turned off, and {L(o)+R(o)} is directly transmitted through the birefringent plate. When t=T/4, {L(e)+R(e)} is input to an upper ¼ region of the display panel 120 according to the scanning of the display panel 120, and the fourth segment of the polarization switch 130 is turned on in synchronization with a field for {L(e)+R(e)}, and thus the polarization of {L(e)+R(e)} is converted. Accordingly, {L(o)+R(o)} is directly transmitted through the birefringent plate 135, and {L(e)+R(e)} is shifted due to the extraordinary refractive index of the birefringent plate 135 and displayed as separate images for a left eye and a right eye. Thus, crosstalk that is produced by the mixing of {L(o)+R(o)} and {L(e)+R(e)} can be reduced. At t=T/2 and t=T, crosstalk can be reduced by appropriately switching on and off of the segments of the polarization switch 130 corresponding to the odd-numbered field image and the even-numbered field image.

In order to reduce the crosstalk caused by the refresh rate of the display panel 120 line by line as much as possible, the number of the segments of the polarization switch 130 may be increased as much as possible, and preferably, the number of segments and the number of lines of the display panel 120 may be the same and the segments and lines may be synchronized and switched line by line.

Figure 9:
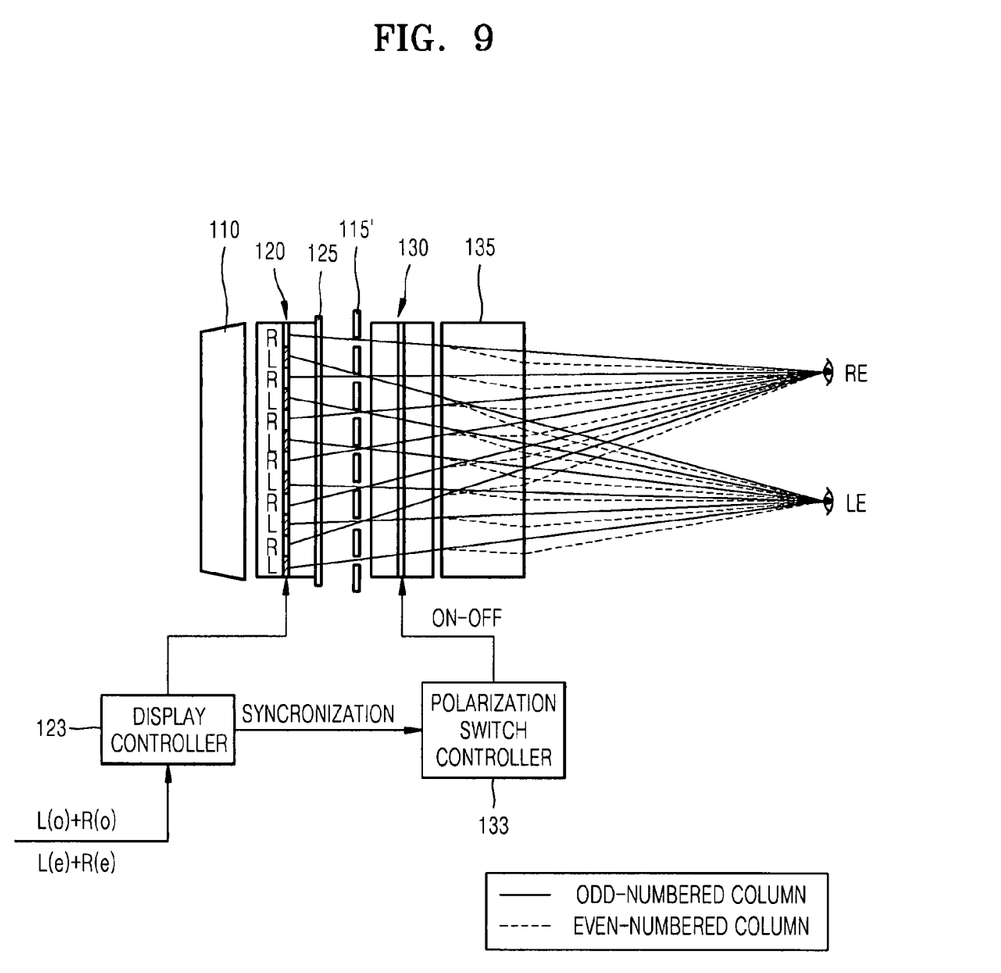
FIG. 9 illustrates an autostereoscopic display according to another exemplary embodiment of the present invention.

FIG. 9 illustrates an autostereoscopic display including a parallax barrier 115' between the polarizer 125 and the polarization switch 130, instead of between the backlight unit 110 and the display panel 120. The only structural difference between the autostereoscopic display of FIGS. 2 and 9 is the location of the parallax barrier. The other operations and effects of the autostereoscopic displays are substantially the same, and thus the description thereof will not be repeated.

An image is formed by the display panel 120 using light emitted from the backlight unit 110, and the image is separated into a left eye image and a right eye image by the parallax barrier 115' and formed at a left eye LE and a right eye RE to form a three-dimensional image. The odd-numbered field {L(o)+R(o)} and the even-numbered field {L(e)+R(e)} are sequentially shifted and displayed by the polarization switch 130 and the birefringent plate 135.

The viewing zone separating unit may be a lenticular lens array unit. As illustrated in FIGS. 10A through 10D, the display may include a lenticular lens array unit instead of a front parallax barrier 115' of FIG. 9.

The lenticular lens array unit is disposed between the polarizer 125 and the polarization switch 130, and includes alternately disposed opening and mask units. The lenticular lens array unit separates the viewing zone and the opening of the lenticular lens array unit is reduced by the mask unit so as to prevent the odd-numbered field and the even-numbered field from overlapping each other.

Figure 10A:
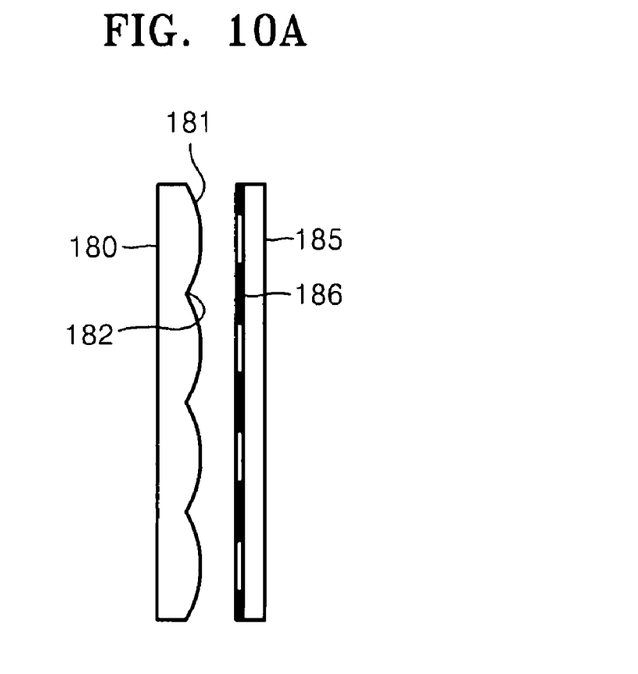
FIGS. 10A through 10D illustrate various examples of a lenticular lens array unit that is employed as a viewing zone separating unit of the autostereoscopic display of FIG. 2.

The lenticular lens array unit can be embodied in various ways. For example, the lenticular lens array unit can include a lenticular lens array 180 in which lenticular lenses 181 are arranged side by side and a barrier 185 that is placed in front of the lenticular lens array 180 as illustrated in FIG. 10A. The barrier 185 includes masks 186 that face boundary regions 182 between the lenticular lenses 181 on a transparent substrate.

Figure 10B:
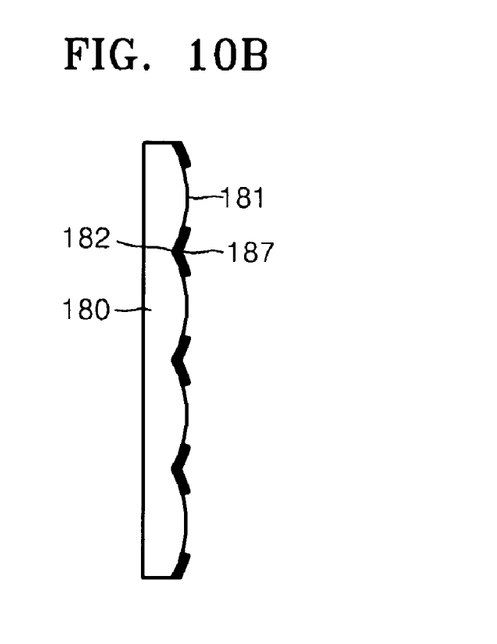

Alternatively, as illustrated in FIG. 10B, masks 187 can be formed in boundary regions 182 between the lenticular lenses 181 of the lenticular lens array 180 in which lenticular lenses 181 are arranged side by side. Opening units are formed between the masks 187.

Figure 10C:
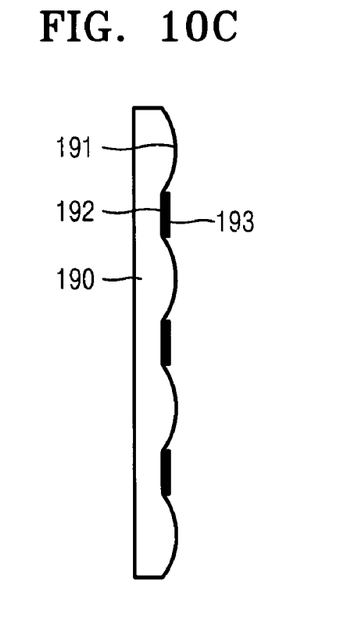

Alternatively, as illustrated in FIG. 10C, the lenticular lens array unit can include a lenticular lens array 190 including lenticular lenses 191 and flat portions 192 disposed between the lenticular lenses 191. Masks 193 may be formed on the flat portions 192.

Figure 10D:
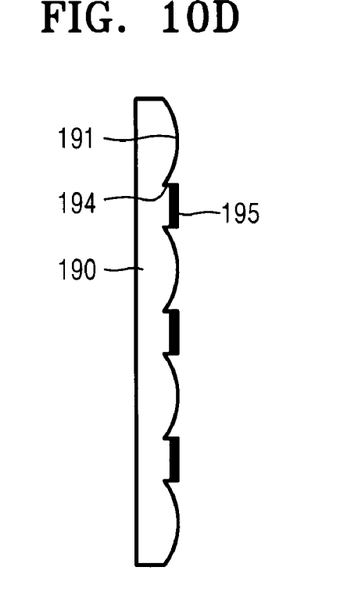

Alternatively, as illustrated in FIG. 10D, the lenticular lens array unit can include a lenticular lens array 190 including lenticular lenses 191 that are formed side by side, and flat portions 194 that protrudes between the lenticular lenses 191. Masks 193 may be formed on the flat portions 194.

Figure 11:
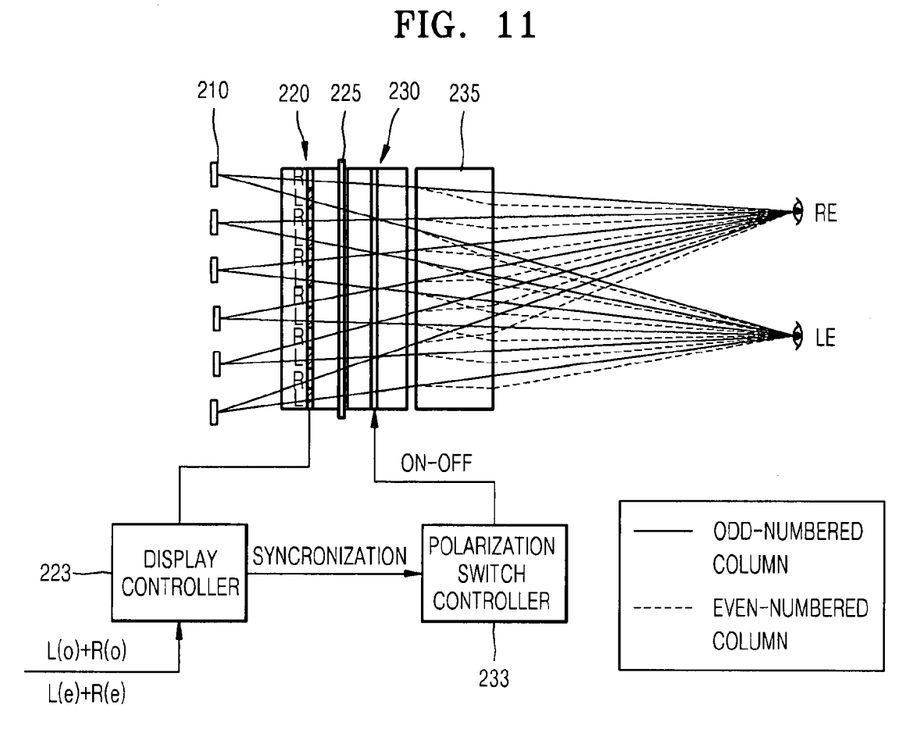
FIG. 11 illustrates an autostereoscopic display according to another exemplary embodiment of the present invention.

FIG. 11 illustrates an autostereoscopic display according to another exemplary embodiment of the present invention. Referring to FIG. 11, the autostereoscopic display includes a vertically striped light source 210 radiating vertical lines of light at predetermined intervals and a display panel 220 forming an image from light from the vertically striped light source 210. A polarizer 225 polarizes the light output from the display panel 220 into light of a predetermined polarization, a polarization switch 230 selectively converts the polarization of the light output from the polarizer 225. A birefringent plate 235 whose index of refraction depends on the polarization of incident light is disposed in front of the polarization switch 230.

The light source 210 radiates light in vertical stripes and separates the viewing zones of a right eye image and a left eye image to display a three-dimensional image. The vertically striped light source 210 functions as the backlight unit 110 and the parallax barrier 115 of the display in FIG. 2, and an image formed in the display panel 220 using the light radiated from the vertically striped light source 210 is separated into the left eye and the right eye and displayed.

The display panel 220 includes a display controller 223 inputting signals and a polarization switch controller 233 that is synchronized with the display controller 223 and switches the polarization switch 230. For example, when a graphics signal indicating an odd-numbered field L(o)+R(o) is input from the display panel 220, an odd-numbered field image is formed in the display panel 220 according to the graphics signal. The odd-numbered field image is polarized into first polarized light by the polarizer 225 and passes through the polarization switch 230, which is turned off, without a change of polarization and is incident on the birefringent plate 235. The birefringent plate 235 has, for example, an ordinary index of refraction with respect to the first polarized light, and thus the first polarized light is directly transmitted through the birefringent plate 235. The vertical stripe light source 210 separates the odd-numbered field image into a left eye odd-numbered field image and a right eye odd-numbered field image, which are respectively displayed to the left eye and the right eye.

When the graphics signal corresponds to an even-numbered field image L(e)+R(e), the polarization switch 230, which is synchronized with the graphics signal of the even-numbered field, is turned on. The display panel 220 forms an even-numbered field image according to the input graphics signal, and the even-numbered field image is polarized into first polarized light by the polarizer 225. Then, the even-numbered field image is converted into second polarized light by the polarization switch 230 and is incident on the birefringent plate 235. Since the birefringent plate 235 has an extraordinary refractive index with respect to second polarized light, the even-numbered field image is refracted when transmitted through the birefringent plate 235, and is thus shifted by a predetermined amount relative to the odd-numbered field image, and displayed to a left eye and a right eye. The image shifting by the birefringent plate 235 is the same as described above with reference to FIG. 2.

Figure 12:
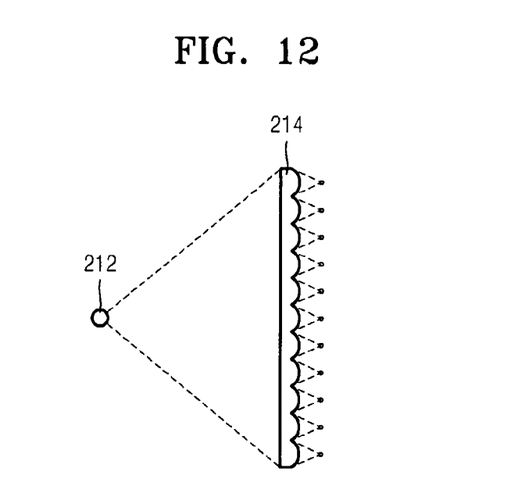
FIG. 12 illustrates a vertically striped light source included in the autostereoscopic display of FIG. 11.

The vertically striped light source 210 may include, as illustrated in FIG. 12, a lamp 212 and a lenticular lens array 214. The light emitted from the lamp 212 is focused in a vertical direction by the lenticular lens array 214 as vertical stripes. The lamp 212 may be a cold cathode fluorescent lamp (CCFL). The vertically striped light source 210 may have other various configurations.

The autostereoscopic display according to the exemplary embodiments of the present invention provides a three-dimensional image with the full resolution of a display panel in a sequential driving manner, and can be achieved using the good response characteristics and the high transmission rate of a flat panel such as a LCD panel for application in televisions, computer monitors and other devices.

The full resolution can be realized by shifting the odd-numbered field and the even-numbered field using a birefringent plate, and a right eye graphics signal of an odd-numbered field and an even-numbered field is input to the same cell in the display panel, and a left eye graphics signal of an odd-numbered field and an even-numbered field is input to the same cell, thereby reducing crosstalk that is likely to occur due to an insufficient responding speed of the display panel. Moreover, even when the responding speed of the display panel is relatively small, flickering can be reduced by the time-sequential display of the odd-numbered field image and the even-numbered field image.

Also, crosstalk caused by refreshing of the graphics data line by line can be reduced by synchronizing the polarization switch converting the polarization of the image with the refresh rate of the display panel and switching line by line.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An autostereoscopic display comprising:
   a backlight unit;
   a display panel which displays an odd numbered column field and an even numbered column field in a time sequential manner using light emitted from the backlight unit, wherein the odd numbered column field comprises odd numbered columns of a left eye image and odd numbered columns of a right eye image, and the even numbered columns field comprises even numbered columns of the left eye image and even numbered columns of the right eye image;
   a viewing zone separating unit which separates viewing zones of a right eye image and a left eye image of the odd numbered column field and the even numbered column field;
   a polarizer which polarizes the light output from the display panel to produce first polarized light;
   a polarization switch which converts the first polarized light into second polarized light that is polarized in a different direction than the first polarized light, wherein the polarization switch is switched in synchronization with the displaying of the odd numbered column field and the even numbered column field by the display panel; and
   a birefringent plate which has a refractive index that varies according to a polarization of incident light,
   wherein the first polarized light is formed with the odd numbered column field and the second polarized light is formed with the even numbered column field in a time sequential manner, and the second polarized light is shifted with respect to the first polarized light by the birefringent plate so that the odd numbered columns and the even numbered columns of the left eye image form a combined image for a left eye and the odd numbered columns and the even numbered columns of the right eye image form a combined image for a right eye to provide autostereoscopic display.

2. The autostereoscopic display of claim 1, wherein the viewing zone separating unit comprises a parallax barrier that is interposed between the backlight unit and the display panel and transmits light from the backlight unit through a slit to the display panel.

3. The autostereoscopic display of claim 1, wherein the viewing zone separating unit comprises a parallax barrier which is interposed between the polarizer and the polarization switch and separates the light output from the display panel through a slit into the right eye image and the left eye image.

4. The autostereoscopic display of claim 1, wherein the viewing zone separating unit comprises a lenticular lens array unit which is interposed between the polarizer and the polarization switch and comprises alternating opening units and mask units.

5. The autostereoscopic display of claim 4, wherein the lenticular lens array unit comprises:
- a lenticular lens array comprising a plurality of lenticular lenses arranged side by side; and
- a barrier which is disposed in front of the lenticular lens array and comprises a plurality of masks facing boundary regions between the lenticular lenses.

6. The autostereoscopic display of claim 4, wherein the lenticular lens array unit comprises:
- a lenticular lens array comprising a plurality of lenticular lenses arranged side by side; and
- a plurality of masks disposed in boundary regions between the lenticular lenses.

7. The autostereoscopic display of claim 4, wherein the lenticular lens array unit comprises:
- a lenticular lens array comprising a plurality of lenticular lenses arranged side by side at intervals with flat portions between the lenticular lenses; and
- a plurality of masks respectively disposed on the flat portions.

8. The autostereoscopic display of claim 4, wherein the lenticular lens array unit comprises:
- a lenticular lens array comprising a plurality of lenticular lenses arranged at intervals with flat portions protruding between the lenticular lenses; and
- a plurality of masks disposed on the flat portions.

9. The autostereoscopic display of claim 1, further comprising:
- a display controller which transfers graphics signals to the display panel; and
- a polarization switch controller which is synchronized with the display controller and toggles the polarization switch on and off.

10. The autostereoscopic display of claim 1, wherein the polarization switch is synchronized with a graphics data refresh rate of the display panel and switched on and off.

11. The autostereoscopic display of claim 1, wherein the distance by which the birefringent plate shifts the second polarized light relative to the first polarized light satisfies the following condition:

$$d = \frac{t(n_0 - n_e)}{2n_0}$$

where t is a thickness of the birefringent plate, $n_0$ is a refractive index of the birefringent plate with respect to the first polarized light, and $n_e$ is a refractive index of the birefringent plate with respect to the second polarized light.

12. An autostereoscopic display comprising:
- a vertically striped light source radiating vertical lines of light at predetermined intervals;
- a display panel which displays an odd numbered column field and an even numbered column field in a time sequential manner using the vertical lines of light, wherein the odd numbered column field comprises odd numbered columns of a left eye image and odd numbered columns of a right eye image and the even numbered columns field comprises even numbered columns of the left eye image and even numbered columns of the right eye image;
- a polarizer which polarizes the light output from the display panel into first polarized light;
- a polarization switch which converts the first polarized light into second polarized light that is polarized in a different direction than the first polarized light, wherein the polarization switch is switched in synchronization with the displaying of the odd numbered column field and the even numbered column field by the display panel; and
- a birefringent plate that has an index of refraction that varies according to the polarization of incident light,
- wherein each of the odd numbered column field and the even numbered column field is separated by the vertical lines of light into a left eye image and a right eye image, and the first polarized light is formed with the odd numbered column field the second polarized light is formed with the even numbered column field in a time sequential manner, and the second polarized light is shifted with respect to the first polarized light by the birefringent plate so that the odd numbered columns and the even numbered columns of the left eye image form a combined image for a left eye, and the odd numbered columns and the even numbered columns of the right eye image form a combined image for a right eye to provide autostereoscopic display.

13. The autostereoscopic display of claim 12, further comprising:
- a display controller which transmits graphics signals to the display panel; and
- a polarization switch controller which is synchronized with the display controller and toggles the polarization switch on and off.

14. The autostereoscopic display of claim 12, wherein the polarization switch is synchronized with a graphics data refresh rate of the display panel and switched on and off.

15. The autostereoscopic display of claim 12, wherein the distance by which the birefringent plate shifts the second polarized light relative to the first polarized light satisfies the following condition:

$$d = \frac{t(n_0 - n_e)}{2n_0}$$

where t is a thickness of the birefringent plate, $n_0$ is a refractive index of the birefringent plate with respect to the first polarized light, and $n_e$ is a refractive index of the birefringent plate with respect to the second polarized light.

* * * * *